United States Patent
Sawamura et al.

(10) Patent No.: US 9,126,283 B2
(45) Date of Patent: Sep. 8, 2015

(54) ELECTRIC RESISTANCE WELDED OIL COUNTRY TUBULAR GOODS AND MANUFACTURING METHOD OF ELECTRIC RESISTANCE WELDED OIL COUNTRY TUBULAR GOODS

(75) Inventors: Mitsuru Sawamura, Tokyo (JP); Hitoshi Asahi, Tokyo (JP)

(73) Assignee: NIPPON STEEL AND SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/806,688

(22) PCT Filed: Feb. 3, 2012

(86) PCT No.: PCT/JP2012/052512
§ 371 (c)(1),
(2), (4) Date: Dec. 21, 2012

(87) PCT Pub. No.: WO2012/144248
PCT Pub. Date: Oct. 26, 2012

(65) Prior Publication Data
US 2013/0092280 A1    Apr. 18, 2013

(30) Foreign Application Priority Data
Apr. 19, 2011   (JP) ................. 2011-093319

(51) Int. Cl.
*B23K 11/00* (2006.01)
*C22C 38/12* (2006.01)
(Continued)

(52) U.S. Cl.
CPC ............... *B23K 11/00* (2013.01); *B21C 37/08* (2013.01); *B23K 11/002* (2013.01);
(Continued)

(58) Field of Classification Search
CPC ........ C22C 38/02; C22C 38/04; C22C 38/12; C22C 38/14; C21D 2211/002; B23K 11/00
USPC ............................................. 148/320
See application file for complete search history.

(56) References Cited

U.S. PATENT DOCUMENTS

| | | | |
|---|---|---|---|
| 4,772,771 A | 9/1988 | Murayama et al. | |
| 7,459,033 B2 * | 12/2008 | Asahi et al. | 148/320 |
| 8,070,887 B2 | 12/2011 | Asahi et al. | |
| 2003/0217795 A1 | 11/2003 | Asahi et al. | |
| 2007/0125462 A1 * | 6/2007 | Asahi et al. | 148/593 |
| 2009/0092514 A1 * | 4/2009 | Asahi et al. | 420/90 |
| 2013/0056115 A1 * | 3/2013 | Fukushi et al. | 148/593 |

FOREIGN PATENT DOCUMENTS

| | | |
|---|---|---|
| EP | 0 080 809 A1 | 6/1983 |
| EP | 1 354 973 A1 | 10/2003 |

(Continued)

OTHER PUBLICATIONS

Chinese Office Action No. 201280002540.2 issued Sep. 22, 2013.
(Continued)

*Primary Examiner* — Jie Yang
*Assistant Examiner* — Xiaowei Su
(74) *Attorney, Agent, or Firm* — Birch, Stewart, Kolasch & Birch, LLP (57) ABSTRACT

[Summary]
[Object] There are provided electric resistance welded oil country tubular goods having strength corresponding to API specification 5CT P110 without a heat treatment being performed on the whole steel pipe and further having excellent toughness, and a manufacturing method of an electric resistance welded oil country tubular goods.
[Solution] Electric resistance welded oil country tubular goods according to the present invention have a chemical composition that contains, in mass %, C: 0.05 to 0.12%, Si: 0.03 to 0.5%, Mn: 0.80 to 2.2%, P: 0.03% or less, S: 0.003% or less, Al: 0.08% or less, Nb: 0.01% to 0.10%, Ti: 0.005 to 0.03%, B: 0.0005 to 0.0030%, and N: 0.008% or less, and in which Ti>3.4 N is satisfied, its balance is composed of Fe and inevitable impurities, and, $V_{C90}$ is 15 to 40.

7 Claims, 1 Drawing Sheet

(51) Int. Cl.
| | |
|---|---|
| *C22C 38/14* | (2006.01) |
| *B21C 37/08* | (2006.01) |
| *C22C 38/00* | (2006.01) |
| *C22C 38/02* | (2006.01) |
| *C22C 38/04* | (2006.01) |
| *C22C 38/06* | (2006.01) |
| *C21D 8/10* | (2006.01) |
| *C21D 9/08* | (2006.01) |
| *F16L 9/00* | (2006.01) |
| *C21D 8/02* | (2006.01) |
| *C21D 1/18* | (2006.01) |
| *C21D 1/25* | (2006.01) |
| *F16L 13/02* | (2006.01) |

(52) U.S. Cl.
CPC ............ *B23K 11/0073* (2013.01); *C21D 1/18* (2013.01); *C21D 1/25* (2013.01); *C21D 8/0226* (2013.01); *C21D 8/0263* (2013.01); *C21D 8/105* (2013.01); *C21D 9/08* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *F16L 9/00* (2013.01); *F16L 13/02* (2013.01); *B23K 2201/06* (2013.01); *B23K 2201/10* (2013.01); *B23K 2203/04* (2013.01)

(56) References Cited

FOREIGN PATENT DOCUMENTS

| | | | |
|---|---|---|---|
| EP | 2 039 793 A1 | | 3/2009 |
| JP | 61-272318 A | | 12/1986 |
| JP | 61-279623 A | | 12/1986 |
| JP | 3-31423 A | | 2/1991 |
| JP | 6-145881 A | | 5/1994 |
| JP | 7-102321 A | | 4/1995 |
| JP | 2004-131799 A | | 4/2004 |
| JP | 2011-6781 A | | 1/2011 |
| JP | 2011006781 A | * | 1/2011 |
| WO | 2005/061749 A2 | | 7/2005 |
| WO | 2010/052926 A1 | | 5/2010 |

OTHER PUBLICATIONS

Chinese Office Action from Chinese Application No. 201280002540.2 issued May 26, 2014 and English translation thereof.

Chinese Office Action, dated Jan. 12, 2015, for Japanese Application No. 201280002540.2, with English translation.

International Search Report, dated May 1, 2012, issued in PCT/JP2011/052512.

* cited by examiner

ELECTRIC RESISTANCE WELDED OIL COUNTRY TUBULAR GOODS AND MANUFACTURING METHOD OF ELECTRIC RESISTANCE WELDED OIL COUNTRY TUBULAR GOODS

TECHNICAL FIELD

The present invention relates to electric resistance welded oil country tubular goods and a manufacturing method of an electric resistance welded oil country tubular goods. In particular, the present invention relates to electric resistance welded oil country tubular goods having a strength corresponding to API specification 5CT P110 (yield stress YS: 758 to 965 MPa and tensile strength TS: 862 MPa or more) and further having excellent toughness, and a manufacturing method of an electric resistance welded oil country tubular goods.

BACKGROUND ART

In recent years, the drilling depth of an oil well or a gas well (hereinafter generically referred to as oil well) has tended to become deeper and deeper, and in order to increase collapse pressure of a casing or the like, an increase in strength of oil country tubular goods has been required.

Conventionally, as the oil country tubular goods, a seamless steel pipe or an electric resistance welded steel pipe has been used. In the case of a steel pipe requiring high strength, after the pipe forming, by performing quenching and tempering on the whole steel pipe, the strength has been secured and the toughness has been improved. On the other hand, recently, with the aim of reducing the drilling cost, a need has been increasing for an as-formed electric resistance welded steel pipe without being subjected to a heat treatment to be performed after the pipe forming.

Among the steel pipes for an oil well, a low-cost electric resistance welded steel pipe has been used for the case when one having relatively low strength is allowed, such as a casing located near the ground surface or the like. Further, the API specification Spec 5CT K55 electric resistance welded oil country tubular goods is manufactured in a state of being as-formed into a pipe (in a manner that quenching and tempering are omitted), and electric resistance welded oil country tubular goods corresponding to API specification Spec 5CT N80 is sometimes manufactured in a state of being as-formed into a pipe. However, in the case when the strength equal to or more than the above strength, for example, the strength corresponding to API specification 5CT P110 is needed, it has not been possible to perform the manufacture without performing a heat treatment after the pipe forming.

For example, in Patent Document 1 and Patent Document 2, there has been disclosed a technique in which after a steel pipe is made, only a weldheat-affected zone is reheated and then is quenched, and thereafter the whole steel pipe is tempered to thereby secure strength.

However, in the case of the electric resistance welded steel pipe, when the tempering is performed on the whole steel pipe, the manufacturing cost is increased. Further, when the quenching is performed, the dimensional accuracy is deteriorated by heat strain, and thus a process such as straightening is needed again.

For such a problem, there has been proposed a manufacturing technique of a high-strength steel pipe allowing a heat treatment for the whole steel pipe to be omitted.

For example, in Patent Document 3, there has been disclosed a method of manufacturing an electric resistance welded steel pipe whose strength and low temperature toughness are achieved not by performing a heat treatment for the whole steel pipe but by performing accelerated cooling after hot-rolling, coiling at a temperature of 250° C. or lower, and making a microstructure to be turned to a two-phase structure of MA constituent consisting of martensite and retained austenite mixed therein and microscopic ferrite.

Further, in Patent Document 4, there has been disclosed a method of manufacturing an electric resistance welded steel pipe whose strength is improved not by performing a heat treatment for the whole steel pipe but by performing rapid cooling after hot-rolling of a slab with high C content.

PRIOR ART DOCUMENT

Patent Document

Patent Document 1: Japanese Patent Publication No. 61-272318
Patent Document 2: Japanese Patent Publication No. 61-279623
Patent Document 3: Japanese Patent Publication No. 6-145881
Patent Document 4: Japanese Patent Publication No. 7-102321

DISCLOSURE OF THE INVENTION

Problems to Be Solved by the Invention

The strength necessary for API specification 5CT P110 is yield stress Ys: 758 to 965 MPa and tensile strength Ts: 862 MPa or more, so that in order to obtain the strength corresponding to API specification 5CT P110, the tensile strength of 862 MPa or more is needed. In order to secure the high strength as above by omitting quenching and tempering, it is necessary to improve the strength by utilizing work hardening by a pipe forming process, and it becomes important to restrict the yield stress. For example, in the case of the same yield stress, when a yield to tensile ratio is 0.9, the tensile strength of 862 MPa or more is required, and when the yield to tensile ratio is 0.85, the tensile strength of 892 MPa or more is required. When the tensile strength is too high, forming becomes difficult to be performed and the toughness is decreased, and thus in order to secure the strength corresponding to API specification 5CT P110, the high yield to tensile ratio is desired. Note that the yield to tensile ratio (Y/T) is a ratio of the yield stress to the tensile strength.

However, in the method of Patent Document 3, the microstructure is a two-phase structure of ferrite and MA constituent and the yield to tensile ratio is low, and thus it is difficult to secure the strength corresponding to API specification 5CT P110 that is needed in the present invention. Further, in the two-phase structure having a bainite structure mixed therein, the toughness is likely to deteriorate.

Further, in the method of Patent Document 4, the C content is high and thus the strength can be secured, but there is a limit to improvement of the toughness and thus it is difficult to achieve the strength and the toughness.

Thus, the present invention has been made in consideration of the above-described circumstances, and has an object to provide electric resistance welded oil country tubular goods and a manufacturing method of electric resistance welded oil country tubular goods, each having strength corresponding to API specification 5CT P110 without a heat treatment being performed on the whole steel pipe and further having excellent toughness.

Means for Solving the Problems

It has been considered that a steel having a low yield to tensile ratio such as a two-phase structure is disadvantageous for securing the strength corresponding to API specification 5CT P110 by utilizing the work hardening by a pipe forming process, so that attention has been paid to utilization of a bainite uniform structure. Further, for increasing the yield to tensile ratio, it is extremely effective to decrease a C content. Then, for decreasing the C content and achieving the bainite uniform structure as above, it is important to secure hardenability.

In the present invention, $V_{C90}$ representing a cooling rate leading to the hardness of 90% martensite (the hardness corresponding to a 90% martensite structure) presumed from a C content (see Expression (1) below) is used as an parameter of the hardenability. As $V_{C90}$ representing the parameter of the hardenability is smaller, the hardenability is higher, and if $V_{C90}$ is too large, the hardenability is low to make the strength insufficient. On the other hand, the inventors elucidated that if $V_{C90}$ is too small, the strength is increased excessively.

$$\log V_{C90}=2.94-0.75(2.7[C]+0.4[Si]+[Mn]+0.45[Ni]+0.45[Cu]+0.8[Cr]+2[Mo]) \quad (1)$$

Here, [C] represents a C content (%), [Si] represents an Si content (%), [Mn] represents an Mn content (%), [Ni] represents an Ni content (%), [Cu] represents a Cu content (%), [Cr] represents a Cr content (%), and [Mo] represents a Mo content (%).

Generally, in the case when a steel slab is hot-rolled and is cooled at various cooling rates, as the cooling rate is larger, the strength of an obtained steel plate is increased. Here, the inventors examined an effect of the cooling rate on the strength of the steel plate after hot-rolling using each of a steel slab with a constant C content having a chemical composition having small $V_{C90}$ and a steel slab having a chemical composition having large $V_{C90}$. As a result, it was found that in the case where the chemical composition has small $V_{C90}$, that is, the high hardenability, an increasing amount of the strength is increased, and a changing amount of the strength by changing the cooling rate is also increased.

Figure 1:
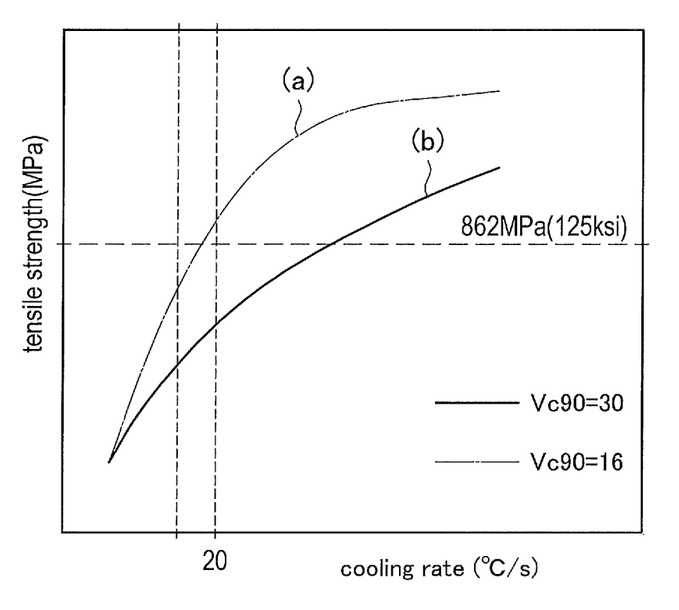
FIG. 1 is a schematic graph for explaining a change in strength with respect to a cooling rate in the case when two types of steel slabs each containing the same C content and having different $V_{C90}$ are used.

FIG. 1 is a schematic graph for explaining the effect of the cooling rate on the change in strength in the case of using two types of steel slabs each containing the same C content and having different $V_{C90}$. A curve (a) in FIG. 1 indicates the case of using the steel slab having small $V_{C90}$, and a curve (b) in FIG. 1 indicates the case of using the steel slab having large $V_{C90}$. As indicated by both the curves, as the cooling rate is increased, the strength increases, and the curve (a) for small $V_{C90}$ indicates that the strength increases more. However, in the case of the curve (a), it is found that in a range of the small cooling rate, particularly in a range of less than 20° C./s, the inclination of the curve is large and the change in the strength is remarkable. As above, as $V_{C90}$ is smaller, the hardenability is increased, and with respect to the change in the cooling rate, the increase in the strength becomes notable. Thus, when $V_{C90}$ is decreased, the change in the strength with respect to the cooling rate increases, thereby making it difficult to adjust the strength.

From such knowledge, the inventors elucidated that by adjusting chemical compositions of steel so as to make the range of the value of $V_{C90}$ fall within a range of 15 to 40, the strength can be improved and the control of the strength by the cooling rate is facilitated.

Next, the inventors examined means of improving the strength and securing satisfactory toughness.

In the present invention, for securing the strength corresponding to API specification 5CT P110 by omitting quenching and tempering, the steel is work-hardened by utilizing strain introduced by a pipe forming process in cold working. For that reason, as described above, it is very important to decrease the C content and increase the yield to tensile ratio by turning the structure to the bainite uniform structure, and to decrease $V_{C90}$ by adjusting amounts of alloy elements. Generally, if the C content is increased, the strength can be increased, but the toughness is decreased, and therefore, the limitation of the C content is effective also for securing the toughness.

The inventors elucidated that the C content is controlled to fall within a predetermined range in order to secure the necessary strength and secure the high yield to tensile ratio and the satisfactory toughness, and thereby being capable of achieving the high yield to tensile ratio and securing the excellent toughness without deteriorating the strength.

Further, the inventors elucidated that as described above, by performing the control of $V_{C90}$ and decreasing a coiling temperature after hot-rolling, it is possible to suppress formation of polygonal ferrite and turn the structure to the uniform bainite structure. By making the structure uniform, variations of a mechanical property of the electric resistance welded steel pipe can be suppressed more remarkably. That is, by controlling the C content, $V_{C90}$, and the coiling temperature together, the electric resistance welded steel pipe excellent in balance between the strength and the toughness can be obtained.

Thus, the inventors have reached the present invention by technical ideas based on the above knowledge.

The summary of the present invention aiming at solving the above-described problems is as follows.

[1] An electric resistance welded oil country tubular goods including: a chemical composition that contains, in mass %,
C: 0.05 to 0.12%,
Si: 0.03 to 0.5%,
Mn: 0.80 to 2.2%,
P: 0.03% or less,
S: 0.003% or less,
Al: 0.08% or less,
Nb: 0.01% to 0.10%,
Ti: 0.005 to 0.03%,
B: 0.0005 to 0.0030%, and
N: 0.008% or less and in which Ti>3.4 N is satisfied, its balance is composed of Fe and inevitable impurities, and $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo].

$$\log V_{C90}=2.94-0.75(2.7[C]+0.4[Si]+[Mn]+0.45\,[Ni]+0.45\,[Cu]+0.8[Cr]+2[Mo]) \quad (1)$$

[2] The electric resistance welded oil country tubular goods according to [1], further containing one type or two types or more selected from, in mass %,
Ni: 1% or less,
Cu: 1% or less,
Mo: 0.3% or less,
Cr: 0.8% or less,
V: 0.1% or less, and
Ca: 0.0060% or less.

[3] The electric resistance welded oil country tubular goods according to [1], in which the electric resistance welded oil country tubular goods have a yield stress of 758 to 965 MPa and a tensile strength of 862 MPa or more.

[4] The electric resistance welded oil country tubular goods according to [1], in which the electric resistance welded oil country tubular goods do not have yield point elongation in a test result of a tensile test.

[5] The electric resistance welded oil country tubular goods according to [1], in which the electric resistance welded oil country tubular goods have a yield to tensile ratio of 85% to 95%.

[6] The electric resistance welded oil country tubular goods according to [1], in which a structure of the electric resistance welded oil country tubular goods other than a structure of an electric resistance welded portion is made of a bainite uniform structure.

[7] The electric resistance welded oil country tubular goods according to [2], in which the electric resistance welded oil country tubular goods have a yield stress of 758 to 965 MPa and a tensile strength of 862 MPa or more.

[8] The electric resistance welded oil country tubular goods according to [2], in which the electric resistance welded oil country tubular goods do not have yield point elongation in a test result of a tensile test.

[9] The electric resistance welded oil country tubular goods according to [2], in which the electric resistance welded oil country tubular goods have a yield to tensile ratio of 85% to 95%.

[10] The electric resistance welded oil country tubular goods according to [2], in which a structure of the electric resistance welded oil country tubular goods other than a structure of an electric resistance welded portion is made of a bainite uniform structure.

[11] An electric resistance welded oil country tubular goods manufactured by hot-rolling a steel slab and performing coiling at 300° C. or lower to make a hot-rolled steel plate, and then forming the hot-rolled steel plate into a pipe shape and subjecting edge surfaces to electric resistance welding, the a steel slab having a chemical composition that contains, in mass %,
C: 0.05 to 0.12%,
Si: 0.03 to 0.5%,
Mn: 0.80 to 2.2%,
P: 0.03% or less,
S: 0.003% or less,
Al: 0.08% or less,
Nb: 0.01% to 0.10%,
Ti: 0.005 to 0.03%,
B: 0.0005 to 0.0030%, and
N: 0.008% or less and in which Ti>3.4 N is satisfied, its balance is composed of Fe and inevitable impurities, and $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo].

$$\log V_{C90}=2.94-0.75(2.7[C]+0.4[Si]+[Mn]+0.45[Ni]+0.45[Cu]+0.8[Cr]+2[Mo]) \quad (1)$$

[12] The electric resistance welded oil country tubular goods according to [11], further containing one type or two types or more selected from, in mass %,
Ni: 1% or less,
Cu: 1% or less,
Mo: 0.3% or less,
Cr: 0.8% or less,
V: 0.1% or less, and
Ca: 0.0060% or less.

[13] The electric resistance welded oil country tubular goods according to [11], in which the electric resistance welded oil country tubular goods are manufactured without performing a heat treatment with respect to a pipe body after the electric resistance welding.

[14] The electric resistance welded oil country tubular goods according to [11], in which the electric resistance welded oil country tubular goods have a yield stress of 758 to 965 MPa and a tensile strength of 862 MPa or more.

[15] The electric resistance welded oil country tubular goods according to [11], in which the electric resistance welded oil country tubular goods do not have yield point elongation in a test result of a tensile test.

[16] The electric resistance welded oil country tubular goods according to [11], in which the electric resistance welded oil country tubular goods have a yield to tensile ratio of 85% to 95%.

[17] The electric resistance welded oil country tubular goods according to [11], in which a structure of the electric resistance welded oil country tubular goods other than a structure of an electric resistance welded portion is made of a bainite uniform structure.

[18] The electric resistance welded oil country tubular goods according to [12], in which the electric resistance welded oil country tubular goods are manufactured without performing a heat treatment with respect to a pipe body after the electric resistance welding.

[19] The electric resistance welded oil country tubular goods according to [12], in which the electric resistance welded oil country tubular goods have a yield stress of 758 to 965 MPa and a tensile strength of 862 MPa or more.

[20] The electric resistance welded oil country tubular goods according to [12], in which the electric resistance welded oil country tubular goods do not have yield point elongation in a test result of a tensile test.

[21] The electric resistance welded oil country tubular goods according to [12], in which the electric resistance welded oil country tubular goods have a yield to tensile ratio of 85% to 95%.

[22] The electric resistance welded oil country tubular goods according to [12], in which a structure of the electric resistance welded oil country tubular goods other than a structure of an electric resistance welded portion is made of a bainite uniform structure.

[23] A manufacturing method of an electric resistance welded oil country tubular goods including: hot-rolling a steel slab; performing coiling at 300° C. or lower to make a hot-rolled steel plate;
then forming the hot-rolled steel plate into a pipe shape; and subjecting edge surfaces to electric resistance welding,
the steel slab having a chemical composition that contains, in mass %,
C: 0.05 to 0.12%,
Si: 0.03 to 0.5%,
Mn: 0.80 to 2.2%,
P: 0.03% or less,
S: 0.003% or less,
Al: 0.08% or less,
Nb: 0.01% to 0.10%,
Ti: 0.005 to 0.03%,
B: 0.0005 to 0.0030%, and
N: 0.008% or less and in which Ti>3.4 N is satisfied, its balance is composed of Fe and inevitable impurities, and, $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo].

$$\log V_{C90}=2.94-0.75(2.7[C]+0.4[Si]+[Mn]+0.45[Ni]+ \\ 0.45[Cu]+0.8[Cr]+2[Mo]) \quad (1)$$

[24] The manufacturing method of the electric resistance welded oil country tubular goods according to [23], further containing one type or two types or more selected from, in mass %,
Ni: 1% or less,
Cu: 1% or less,
Mo: 0.3% or less,
Cr: 0.8% or less,
V: 0.1% or less, and
Ca: 0.0060% or less.

[25] The manufacturing method of the electric resistance welded oil country tubular goods according to [23], in which a cooling rate in a range of 650 to 300° C. is set to 15 to 50° C./s.

[26] The manufacturing method of the electric resistance welded oil country tubular goods according to [23], in which a heat treatment with respect to a pipe body is not performed after the electric resistance welding.

[27] The manufacturing method of the electric resistance welded oil country tubular goods according to [24], in which a cooling rate in a range of 650 to 300° C. is set to 15 to 50° C./s.

[28] The manufacturing method of the electric resistance welded oil country tubular goods according to [24], in which a heat treatment with respect to a pipe body is not performed after the electric resistance welding.

[27] The manufacturing method of the electric resistance welded oil country tubular goods according to [24], in which a cooling rate in a range of 650 to 300° C. is set to 15 to 50° C./s.

[28] The manufacturing method of the electric resistance welded oil country tubular goods according to [24], in which a heat treatment with respect to a pipe body is not performed after the electric resistance welding.

Effect of the Invention

As above, according to the present invention, it is possible to provide electric resistance welded oil country tubular goods and a manufacturing method of electric resistance welded oil country tubular goods, each having high strength excellent in balance between strength and toughness, and in particular, the strength corresponding to API specification 5CT P110 without a heat treatment being performed on the whole steel pipe.

MODE FOR CARRYING OUT THE INVENTION

Hereinafter, electric resistance welded oil country tubular goods and a manufacturing method of electric resistance welded oil country tubular goods according to an embodiment will be explained in detail.

The electric resistance welded oil country tubular goods according to the present embodiment includes a chemical composition that contains, in mass %, C: 0.05 to 0.12%, Si: 0.03 to 0.5%, Mn: 0.80 to 2.2%, P: 0.03% or less, S: 0.003% or less, Al: 0.08% or less, Nb: 0.01% to 0.10%, Ti: 0.005 to 0.03%, B: 0.0005 to 0.0030%, and N: 0.008% or less and in which Ti>3.4 N is satisfied, its balance is composed of Fe and inevitable impurities, and $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo]. The electric resistance welded oil country tubular goods according to the present embodiment have the chemical composition as described above to thereby have the strength corresponding to API specification 5CT P110, that is, the strength of yield stress Ys: 758 to 965 MPa and tensile strength Ts: 862 MPa or more according to the C content.

The manufacturing method of the electric resistance welded oil country tubular goods in the present embodiment includes hot-rolling a steel slab performing coiling at 300° C. or lower to make a hot-rolled steel plate, then forming the hot-rolled steel plate into a pipe shape, and subjecting edge surfaces to electric resistance welding, the steel slab having a chemical composition that contains, in mass %, C: 0.05 to 0.12%, Si: 0.03 to 0.5%, Mn: 0.80 to 2.2%, P: 0.03% or less, S: 0.003% or less, Al: 0.08% or less, Nb: 0.01% to 0.10%, Ti: 0.005 to 0.03%, B: 0.0005 to 0.0030%, and N: 0.008% or less and in which Ti>3.4 N is satisfied, its balance is composed of Fe and inevitable impurities, and $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo]—.

$$\log V_{C90}=2.94-0.75(2.7[C]+0.4[Si]+[Mn]+0.45[Ni]+ \\ 0.45[C]0.8[Cr]+2[Mo]) \quad (1)$$

Here, it is described that among the above-mentioned elements, the element whose lower limit is not defined is contained to an inevitable impurity level.

Further, the values of the above-mentioned chemical composition are values in the vicinity of the middle of the plate thickness of a portion (a base metal portion) which is not subjected to electric resistance welding of the electric resistance welded oil country tubular goods.

Hereinafter, the reasons for limiting the chemical compositions of steel product of the present embodiment will be explained. Incidentally, the notation of % means mass % unless otherwise specified.

(C: 0.05 to 0.12%)

C, in the present embodiment, is an important element for increasing the tensile strength, improving the strength by utilizing work hardening in a pipe forming process in cold working, and securing the toughness. Generally, it has been known that when the C content increases, the yield to tensile ratio is decreased. The reason therefore is not necessarily clear, but it is presumably because in the case of a single-phase steel, the content of carbide is increased, and thereby increasing the work hardening and consequently the tensile strength is increased, but an increase in yield strength by precipitation strengthening is suppressed. Further, it is presumed that in the case of a two-phase steel, a hard phase such as martensite is hard and the tensile strength is relatively increased, and consequently the yield to tensile ratio is decreased.

In the present embodiment, the lower limit of the C content is set to 0.05% in order to increase the hardenability and the yield to tensile ratio to thereby secure the strength.

On the other hand, when the C content is too large, the toughness is likely to deteriorate and the yield to tensile ratio is also likely to be decreased, and consequently it becomes difficult to secure the strength corresponding to API specification 5CT P110, and thus the upper limit is set to 0.12%.

Incidentally, in terms of the balance between the toughness and the strength, the C content is preferably set to 0.06 to 0.11%, and is more preferably set to 0.07 to 0.12%.
(Si: 0.03 to 0.5%)

Si is an element useful for deoxidization and improving the strength. The lower limit of the Si content is set to 0.03% in order to sufficiently secure an effect of deoxidization. On the other hand, when Si is contained in large amounts, the toughness and weldability are deteriorated, and thus the upper limit is set to 0.5%.

Incidentally, in terms of the balance between the toughness and the strength, the Si content is preferably set to 0.05 to 0.3%, and is more preferably set to 0.1 to 0.25%.
(Mn: 0.80 to 2.2%)

Mn is an element that improves the hardenability, and is useful for turning the structure to bainite to secure the strength. The lower limit of the Mn content is set to 0.80% in order to sufficiently exhibit the effect of improving the strength and low temperature toughness. On the other hand, similarly as in the case of Si, when Mn is also contained in large amounts, the toughness and weldability are likely to be deteriorated, and thus the upper limit is set to 2.2%.

Incidentally, the Mn content is more preferably set to 1.0% or more and is still more preferably set to 1.5% or more.
(P: 0.03% or less)

P is an impurity and is an element that deteriorates the low temperature toughness, and thus the smaller the content is, the more desirable it is. However, it is necessary to achieve a balance between the cost at a steelmaking stage and the properties as described above, and in the present embodiment, the upper limit is set to 0.03%. The preferable upper limit is 0.02%.
(S: 0.003% or less)

Similarly as in the case of P, S is an element that exists as an impurity. Similarly, the smaller the S content is, the more desirable it is, and by decreasing the S content, MnS is decreased, thereby making it possible to improve the toughness. However, in consideration of the cost at the steelmaking stage, the upper limit is set to 0.003%.
(Al: 0.08% or less)

Al is an element contained in the steel product as a deoxidizing material normally, but when the content exceeds 0.08%, Al-based nonmetallic inclusions are increased to deteriorate the cleanliness of the steel product, and the toughness is likely to deteriorate, and thus the upper limit is set to 0.05%.

Further, when considering a balance between the stable securing of the deoxidization effect and the toughness, the Al content is preferably set to 0.01 to 0.04%.
(Nb: 0.01 to 0.10%)

Nb is an element that improves the hardenability and suppresses recrystallization of austenite at the time of hot-rolling to make the structure finer. In the present embodiment, the lower limit of the Nb content is set to 0.01% in order to improve the strength and the toughness.

On the other hand, when the Nb content is too large, coarse precipitates may be formed and may deteriorate the toughness, and thus the upper limit of the Nb content is set to 0.10%.

Incidentally, the Nb content is preferably set to 0.02 to 0.08%.
(Ti: 0.005 to 0.03% and Ti>3.4 N)

Ti forms fine TiN, and suppresses coarsening of austenite grains at slab heating process and in HAZ portion to contribute to making the microstructure finer. Further, when the N content to be described later is too large, N bonds to B to form BN, and thus the content of solid solution B effectively working for the hardenability is decreased. On the other hand, adding Ti makes it possible to fix solid solution N as TiN, thereby making solid solution N disappear and to suppress the formation of BN, thereby securing solid solution B that contributes to the improvement of the hardenability. For achieving those purposes, Ti content is added in an amount of 0.005% or more and more than 3.4 N (each mass %).

On the other hand, when the Ti content is too large, coarse TiN and TiC are formed, thereby being likely to deteriorate the toughness, and thus the upper limit is set to 0.03%.

Note that the Ti content is preferably set to 0.01 to 0.025%.
(N: 0.008% or less)

N is an impurity, and when the N content is too large, TiN is increased excessively, thereby being likely to cause adverse effects of a surface flaw, toughness deterioration, and the like, and thus the upper limit is set to 0.008%. On the other hand, when fine TiN is formed in the steel, TiN suppresses coarsening of austenite grains at the slab reheating process and in the HAZ portion to make the microstructure finer and contributes to the improvement in the low temperature toughness of the base metal and the HAZ portion.

Note that the N content is preferably set to 0.002 to 0.005%.
(B: 0.0005 to 0.0030%)

B, in the present embodiment, is an important element for securing the hardenability and suppressing the formation of polygonal ferrite to obtain the uniform bainite structure, thereby improving the strength. Further, B is an element that segregates at grain boundaries at the time of quenching to decrease grain boundary energy and contributes to the improvement of the hardenability even when a small amount of B is added, and the lower limit of the B content is set to 0.0005%. When the B content is less than 0.0005%, expensive alloy elements are needed to be added in large amounts, and thus in order also to cut down the alloy cost, 0.0005% or more of B is needed to be added.

On the other hand, when the B content is too large, such hardenability is saturated and B-containing precipitates ($Fe_{23}(CB)_6$ and the like) are easily formed, and the mechanical property is likely to vary and the toughness is likely to deteriorate, and thus the upper limit is set to 0.0030%.

Note that the B content is preferably set to 0.0006 to 0.002%, and is more preferably set to 0.0009 to 0.0015%.

Further, in the present invention, in addition to the above-described elements, one type or two types or more selected from Ni: 1% or less, Cu: 1% or less, Mo: 0.3% or less: Cr: 0.8% or less, V: 0.1% or less, and Ca: 0.0060% or less may also be added.

Ni is an element that contributes to improving the strength and the toughness. However, Ni is an expensive element, and when the added amount is too large, the economic efficiency is deteriorated, and thus the upper limit of the content is preferably set to 1%. The more preferable upper limit is 0.5%, and the still more preferable upper limit is 0.3%.

Further, adding Ni is effective also for preventing Cu cracking at the time of continuous casting and hot-rolling. In the above case, in order to exhibit such an effect, the Ni content is preferably set to ⅓ or more of the Cu content.

Incidentally, in the present embodiment, Ni is a selective element and is not necessarily needed to be added, but in order to stably obtain the effect obtained by the addition of Ni as described above, the lower limit of the content is preferably set to 0.05%.

Further, Ni is an element that drastically deteriorates a sulfide stress cracking (SSC) property, and thus in the case where $H_2S$ is present, Ni is preferably not added.

Cu is an element effective for improving the strength of the base metal and a welded portion, but when Cu is added in too large amounts, the toughness of the HAZ portion and field weldability are likely to be deteriorated significantly. For that reason, the upper limit of the Cu content is preferably set to 1%. The more preferable upper limit of the Cu content is 0.5%.

Incidentally, in the present embodiment, Cu is a selective element and is not necessarily needed to be added, but in order to stably obtain the effect obtained by the addition of Cu as described above, the lower limit of the content is preferably set to 0.05%.

The reason why Mo is added is to improve the hardenability of the steel product to obtain the high strength. Further, Mo coexists with Nb to suppress the recrystallization of austenite at the time of hot-rolling and contributes to making an austenite structure finer. However, Mo is an expensive element, and when Mo is added excessively, the economic efficiency is deteriorated, and thus the upper limit is preferably set to 0.3%. It is more preferably set to 0.2% or less, and is still more preferably set to 0.1% or less.

Incidentally, in the present embodiment, Mo is a selective element and is not necessarily needed to be added, but in order to stably obtain the effect obtained by the addition of Mo as described above, the lower limit of the content is preferably set to 0.05%.

Cr is an element for improving the hardenability, and the upper limit of the Cr content is preferably set to 0.8%. The more preferable upper limit of the Cr content is 0.7%, and the still more preferable upper limit is 0.5%.

Incidentally, in the present embodiment, Cr is a selective element and is not necessarily needed to be added, but in order to stably obtain the effect obtained by the addition of Cr as described above, the lower limit of the content is preferably set to 0.05%.

V has an effect almost the same as that of Nb, but the effect thereof is low as compared with that of Nb. Further, V also has an effect of suppressing softening of the welded portion. However, the upper limit of the V content is preferably set to 0.1% in terms of the toughness of the HAZ portion and the field weldability.

Incidentally, in the present embodiment, V is a selective element and is not necessarily needed to be added, but the lower limit of the content is more preferably set to 0.05%, and is still more preferably set to 0.03%.

Ca is an element that controls the shape of sulfide-based inclusions to improve the low temperature toughness. When the Ca content exceeds 0.0060%, CaO—CaS turns to a large-sized cluster or inclusion to be likely to adversely affect the toughness. For that reason, the upper limit of the added amount of Ca is preferably set to 0.0060%. Note that the more preferable upper limit is 0.004%.

Incidentally, in the present embodiment, Ca is a selective element and is not necessarily needed to be added, but in order to stably obtain the effect obtained by the addition of Ca as described above, the lower limit of the content is preferably set to 0.001%. More preferably, 0.002% or more of Ca is added.

Further, the balance other than the above-described elements is substantially composed of Fe, and an element that does not deteriorate the operation and effect of the present invention, such as the inevitable impurities, can be added in minute amounts.

Further, in the present embodiment, $V_{C90}$ being an parameter of the hardenability is set to 15 to 40.

Hereinafter, the reason for limiting $V_{C90}$ in the present embodiment will be explained in detail.

In manufacturing the hot-rolled steel plate, a cooling rate of 15 to 50° C./s (an average rate at the middle of the plate thickness of the steel) as will be explained below is applied, and thereby controlling the strength of the hot-rolled steel plate. In the present embodiment, in the chemical composition base as described above, when $V_{C90}$ is too large, the hardenability deteriorates and the strength becomes insufficient, on the other hand, when $V_{C90}$ is too small, the strength increases excessively, and it becomes difficult to control the strength by the cooling rate. Further, when $V_{C90}$ is too large, ferrite is formed and the yield to tensile ratio is sometimes decreased. For that reason, in the present embodiment, $V_{C90}$ is set to 15 to 40.

Incidentally, $V_{C90}$, in the case of the B content being 0.0005% or more, is defined by Expression (1) below, where the C content (%) is represented by [C], the Si content (%) is represented by [Si], the Mn content (%) is represented by [Mn], the Ni content (%) is represented by [Ni], the Cu content (%) is represented by [Cu], the Cr content (%) is represented by [Cr], and the Mo content (%) is represented by [Mo]. Incidentally, C, Si, Mn, Ni, Cu, Cr, and Mo are elements contributing to the improvement of the hardenability. Ni, Cu, Cr, and Mo are elements to be added selectively, and when they are not added intentionally, they are set to 0(%) in Expression (1) below.

$$\log V_{C90}=2.94-0.75(2.7[C]+0.4[Si]+[Mn]+0.45[Ni]+0.45[Cu]+0.8[Cr]+2[Mo]) \quad (1)$$

Further, in this manner, the chemical compositions of steel are adjusted so as to make the value of $V_{C90}$ fall within the range of 15 to 40, and B being the element having the effect of improving the hardenability is added, and thus, the strength can be secured even though the addition of alloy elements is suppressed.

When $V_{C90}$ is too small, it becomes difficult to control the strength by the cooling rate, and thus, setting the lower limit of $V_{C90}$ to 15 or more is effective also for relaxing the manufacturing conditions, and contributes also to the improvement of productivity. Further, $V_{C90}$ is controlled as above and the coiling temperature is set to a low temperature when coiling the hot-rolled steel plate. In this way it is possible to suppress the formation of polygonal ferrite and make the structure uniform, and consequently it is possible to suppress the variations of the mechanical property of the steel pipe.

Note that in order to stably secure the hardenability and make the balance between the strength and the toughness better, $V_{C90}$ is preferably set to 16 to 30.

Next, the manufacturing method of the electric resistance welded steel pipe in the present embodiment will be explained.

In the manufacturing method of the electric resistance welded steel pipe in the present embodiment, the electric resistance welded steel pipe is manufactured in a manner that the steel slab having the above-described chemical composition and $V_{C90}$ is hot-rolled, and is preferably subjected to accelerated cooling to be coiled at 300° C. or lower to make a hot-rolled steel plate, and then the above hot-rolled steel plate is formed into a pipe shape and edge surfaces of the hot-rolled steel plate are electric resistance welded. In order to adjust the out-of-the-roundness and outer diameter of the electric resistance welded steel pipe, sizing is sometimes performed in cold working. Further, after the electric resistance welding and before the sizing, the vicinity of the electric resistance welded portion is sometimes subjected to a heat treatment (a seam heat treatment).

Hereinafter, the reasons for limiting the above-described manufacturing conditions and the like will be explained in detail.

First, the steel slab having the above-described chemical composition and $V_{C90}$ is used, and is subjected to the hot-rolling in a manner that the heating temperature is preferably set to 1000 to 1280° C., and is more preferably set to 1050 to 1250° C., and the rolling finishing temperature is set to fall within a range of 750 to 900° C. Thereafter, the accelerated cooling is performed preferably at the cooling rate of 10° C./s or more. Here, the cooling rate is the average rate at the middle of the plate thickness of the steel and each of the temperatures is set to the average temperature of the steel As will be described in detail below, in the present embodiment, bainite transformation occurs in a range of 650 to 300° C. and the cooling rate in a range of 750 to 650° C. does not affect the bainite transformation, and thus the normal operation process can be applied.

Incidentally, the heating temperature is preferably set to fall within the above-described range in order to sufficiently solid dissolve carbide and prevent the coarsening of crystal grains. This makes it possible to sufficiently secure the strength and obtain the required yield to tensile ratio.

Further, when the rolling finishing temperature is too high, the deterioration of the low temperature toughness caused by the coarsening of crystal grains is likely to occur, and thus the upper limit is preferably set to 900° C. On the other hand, when being too low, the rolling finishing temperature becomes the $Ar_3$ transformation point or lower and the mechanical property is likely to be deteriorated by deformed ferrite, and thus the lower limit of the rolling finishing temperature is preferably set to 750° C. or higher.

Further, the cooling rate of the accelerated cooling at 650° C. or lower at which the bainite transformation starts is more preferably set to 15° C./s or more in order to obtain the uniform bainite structure. This makes it possible to sufficiently secure the strength. On the other hand, when the cooling rate is too fast, the strength is increased excessively, thereby being likely to deteriorate the toughness, and thus 50° C./s is preferably set as the upper limit. The more preferable upper limit is 30° C./s, and the still more preferable upper limit is 20° C./s.

Note that in the present embodiment, the plate thickness of the steel plate after the hot-rolling is not limited, but it is particularly effective when the plate thickness is 5 to 20 mm.

Next, after the above-described accelerated cooling being performed, the coiling is performed to make the hot-rolled steel plate at the coiling temperature of 300° C. or lower. This is for performing the accelerated cooling to the bainite transformation temperature or lower to transform the structure to uniform bainite. However, when the coiling is performed at the coiling temperature exceeding 300° C., the transformation becomes insufficient and granular bainite is formed, and consequently the strength is not likely to be obtained sufficiently. Thus, in the present embodiment, the coiling temperature is set to 300° C. or lower, and the coiling temperature may also become ordinary temperature.

Note that in the present embodiment, the coiling temperature is preferably set to 250° C. or lower.

Next, the above-described hot-rolled steel plate is formed and worked into a pipe shape and the edge surfaces of the hot-rolled steel plate are electric resistance welded to manufacture the electric resistance welded steel pipe.

When the hot-rolled steel plate is formed and worked into a pipe shape in the present embodiment, it is only necessary to continuously form the hot-rolled steel plate into an open pipe, and any well-known forming method can be applied and is not limited in particular.

Further, in the present embodiment, when the electric resistance welding is performed, circumferential direction edge portions of the open pipe are heated by welding means, and the heated edge portions are butted to each other to be pressure welded. Incidentally, as a welding method, an electric resistance welding method utilizing high-frequency current and a induction welding method that are well known are both applicable, and the welding method is not limited in particular.

Incidentally, in the present embodiment, as for the electric resistance welded steel pipe having the circumferential direction edge portions of the open pipe welded to each other, it is preferred that a bead formed on the welded portion be cut next by bead cutting, and thereafter a seam portion is preferably heated to be brought into an austenite region by an induction heat treatment. In this manner, the seam portion is heated by the induction heat treatment, thereby making it possible to control the hardness of the welded portion and to prevent the deterioration of the toughness of the welded portion.

After the seam portion is heated and is acceleratedly cooled, the sizing may also be performed on the electric resistance welded steel pipe in cold working. Incidentally, the sizing is a process of finishing the electric resistance welded steel pipe to have a fixed diameter and a good roundness by using multi-stage sizing rolls. The manufactured electric resistance welded steel pipe is cut into a predetermined length by a cutting machine.

In the present embodiment, the pipe forming process composed of the above-described forming and working and the like is performed in cold working, and as a result of that, the steel can be work-hardened, and the strength corresponding to API specification 5CT P110 can be secured efficiently. As a result, the collapse pressure of the electric resistance welded steel pipe can be increased.

As has been explained above, in the present embodiment, the C content is decreased and the added amount of alloy is adjusted to decrease $V_{C90}$, and in this way, the yield to tensile ratio is increased and the bainite uniform structure is achieved, and consequently the electric resistance welded oil country tubular goods are fabricated, which have the high yield to tensile ratio of 85% to 95% and the satisfactory toughness and exhibiting the strength corresponding to API specification 5CT P110. Incidentally, there is sometimes a case where the structure is not necessarily a bainite single-phase in the vicinity of the seam portion and in a 1 mm range of a surface layer, but the effect on the properties of the steel pipe is small.

Here, in the present embodiment, bainite is a structure other than ferrite, pearlite, and martensite, and means a structure in which cementite exists in a lath-shaped structure. On this occasion, cementite may exist at the grain boundaries, or may also exist in the lath-shaped structure. Further, bainite in the present embodiment is a structure having the lath-shaped structure and is also said to be one from which polygonal ferrite, acicular ferrite, and granular bainite are removed.

Further, in the electric resistance welded oil country tubular goods according to the present embodiment, since a heat treatment such as quenching and tempering is not performed after the electric resistance welding, in the case when a stress-strain curve is made based on a result of a tensile test, yield point elongation does not exist on such a stress-strain curve. This is conceivably because the heat treatment to be performed after the electric resistance welding is not performed, and thus free N and C contained in the structure of the electric resistance welded steel pipe are not diffused to dislocation and do not firmly fix the dislocation, and the yield point elongation does not occur.

Incidentally, it is also possible to consider performing tempering at a low temperature of about 400° C. in order to achieve the high yield to tensile ratio, but in the case when such a heat treatment is performed, carbide (cementite) precipitates at the dislocation, resulting in that a yield point is observed on the stress-strain curve and the yield point elongation occurs.

According to the electric resistance welded oil country tubular goods and the manufacturing method of the electric resistance welded oil country tubular goods according to the present invention as explained above, the chemical compositions of steel are adjusted so as to make the range of the value of $V_{C90}$ fall within the above-described range, and without the hardenability being deteriorated, as a result of that, the strength can be improved. Further, the lower limit value of $V_{C90}$ is set to fall within the above-described range, and thus, an excessive increase in the strength with an increase in the cooling rate when performing the accelerated cooling can be prevented, and as a result, it becomes possible to precisely perform the control of the strength by the cooling rate and to thereby improve the productivity.

According to the electric resistance welded oil country tubular goods and the manufacturing method of the electric resistance welded oil country tubular goods according to the present invention, the C content is set to fall within the above-described range, thereby making it possible to suppress the deterioration of the strength and secure the satisfactory toughness and the high yield to tensile ratio. Further, the B content is set to fall within the above-described range, and as a result of that, the sufficient hardenability can be secured even when the added amount of alloy elements is decreased.

Further, according to the electric resistance welded oil country tubular goods and the manufacturing method of the electric resistance welded oil country tubular goods according to the present invention, $V_{C90}$ is controlled to fall within the above-described range and the coiling temperature is set to a low temperature when the hot-rolled steel plate is coiled, and as a result of that, it is possible to suppress the formation of polygonal ferrite to make the structure uniform. As a result, it is possible to suppress the variations of the mechanical property of the electric resistance welded steel pipe. That is, by controlling both $V_{C90}$ and the coiling temperature, the electric resistance welded steel pipe excellent in balance between the strength and the toughness can be manufactured.

Further, according to the electric resistance welded oil country tubular goods and the manufacturing method of the electric resistance welded oil country tubular goods according to the present invention, the pipe forming process is performed in cold working, and thus it is possible to utilize the work hardening and to more efficiently secure the strength corresponding to API specification 5CT P110. As a result, it is possible to increase the collapse pressure of the electric resistance welded steel pipe.

Example

Hereinafter, the effect of the present invention will be explained by examples, but the present invention is not limited to the conditions used in the following examples.

In this example, first, steels containing chemical compositions adjusted so as to have $V_{C90}$ as shown in Table 1 were melted to make slabs in continuous casting according to an ordinary method. Note that in the case of the B content being less than 0.0005%, $V_{C90}$ is defined by Expression (2) below.

$$\log V_{C90} = 3.69 - 0.75(2.7[C] + 0.4[Si] + [Mn] + 0.45[Ni] + 0.45[Cu] + 0.8[Cr] + [Mo]) \quad (2)$$

Here, [C] represents the C content (%), [Si] represents the Si content (%), [Mn] represents the Mn content (%), [Ni] represents the Ni content (%), [Cu] represents the Cu content (%), [Cr] represents the Cr content (%), and [Mo] represents the Mo content (%). Incidentally, when $V_{C90}$ is calculated using Expression (1) or (2) above, in the case when each of the elements of Ni, Cu, Cr, and Mo in steel types shown in Table 1 is not added or is inevitably added, the content is set to 0(%).

Each of the above slabs was heated in a heating furnace, and was hot-rolled into a plate thickness shown in Table 2, and was acceleratedly cooled to then be coiled in a coil shape, and then each hot-rolled steel plate was made. Each of the heating temperature, the rolling finishing temperature, the cooling rate, and the coiling temperature at this time is as shown in Table 2.

Incidentally, as for the chemical composition and the rolling condition shown in Table 1 and Table 2, an underline is added to the numerical value falling outside the present invention range. Further, (−) in Table 1 means no addition or means that an inevitable amount is contained.

Next, the coil-shaped hot-rolled steel plates were each uncoiled, and the hot-rolled steel plates were each formed into a pipe shape and edge surfaces of each of the hot-rolled steel plates was electric resistance welded, and each electric resistance welded steel pipe was manufactured. Note that in this example, the welding was performed by using an electric resistance welding method.

Next, a bead formed on each welded portion was cut, and then each seam portion was heat treated by an induction heat treatment.

Next, in order to have each steel pipe outer diameter shown in Table 2, a sizing process was performed in cold working so as to have a predetermined dimension—shape by using sizing rolls according to need, and then each of the steel pipes was cut into a desired length by a cutting machine.

The properties of each of the electric resistance welded steel pipes manufactured as above were measured.

Specifically, a full-thickness test piece in the axial direction (rolling direction) of the steel pipe was taken from each of the above-described electric resistance welded steel pipes as a tensile test piece and was subjected to a tensile test to measure the yield stress (YS: 0.2% offset) and the tensile strength (TS). Here, the full-thickness test piece and the tensile test piece were taken from the portion corresponding to a position of 90° in the circumferential direction from the seam portion of the electric resistance welded steel pipe. Further, from the measured YS and TS, the yield to tensile ratio (Y/T) was obtained. Incidentally, the following were evaluated as satisfactory: YS is 758 to 965 MPa TS is 862 MPa or more, and the yield to tensile ratio (Y/T) is 85% or more. Further, with reference to obtained results of the tensile test, it was evaluated whether or not the yield point elongation exists. These measurement results are shown in Table 2. Further, the microstructure was observed on the cross section at a position of 90° from the seam portion and parallel to the rolling direction at a quarter thickness portion by nital etching.

Further, the toughness of each of the electric resistance welded steel pipes was measured.

As for the toughness, a full-size V-notch Charpy test piece in the circumferential direction (the direction perpendicular to the rolling) was taken from each of the electric resistance welded steel pipes and was subjected to a V-notch Charpy test to measure absorbed energy at 0° C. (a CVN value). Here, the full-size V-notch Charpy test piece was taken from the portion corresponding to a position of 90° in the circumferential direction from the seam portion of the electric resistance welded steel pipe.

The above measurement results are shown in Table 2. A required value of the absorbed energy of P110 grade specified in API specification 5CT changes according to the plate thickness, and hence, a required value corresponding to each of the plate thicknesses in this example is shown in Table 2. Then, in this example, the absorbed energy equal to or more of the above required value was evaluated to be satisfactory.

TABLE 1

| STEEL TYPE | C | Si | Mn | P | S | Nb | B | Al | Ti | N | Ni |
|---|---|---|---|---|---|---|---|---|---|---|---|
| A | 0.07 | 0.18 | 1.79 | 0.014 | 0.0021 | 0.031 | 0.0009 | 0.024 | 0.012 | 0.0032 | |
| B | 0.08 | 0.22 | 1.81 | 0.011 | 0.0017 | 0.027 | 0.0011 | 0.021 | 0.016 | 0.0034 | |
| C | 0.07 | 0.21 | 1.58 | 0.008 | 0.0014 | 0.013 | 0.0006 | 0.032 | 0.015 | 0.0026 | |
| D | 0.05 | 0.12 | 1.05 | 0.018 | 0.0012 | 0.045 | 0.0009 | 0.019 | 0.016 | 0.0042 | |
| E | 0.11 | 0.25 | 0.82 | 0.011 | 0.0028 | 0.026 | 0.0015 | 0.036 | 0.016 | 0.0035 | 0.20 |
| F | 0.06 | 0.08 | 1.77 | 0.015 | 0.0024 | 0.072 | 0.0012 | 0.018 | 0.013 | 0.0024 | 0.45 |
| G | 0.06 | 0.13 | 1.95 | 0.009 | 0.0008 | 0.041 | 0.0027 | 0.042 | 0.025 | 0.0048 | 0.05 |
| AA | 0.10 | 0.21 | 1.75 | 0.016 | 0.0019 | 0.033 | <u>0.0002</u> | 0.024 | 0.012 | 0.0032 | 0.10 |
| BB | 0.07 | 0.18 | 1.79 | 0.014 | 0.0021 | 0.031 | 0.0009 | 0.024 | 0.009 | 0.0058 | |
| CC | 0.11 | 0.25 | 1.85 | 0.011 | 0.0017 | 0.027 | 0.0011 | 0.021 | 0.016 | 0.0034 | 0.10 |
| DD | 0.06 | 0.21 | 1.51 | 0.012 | 0.0015 | 0.029 | 0.0013 | 0.028 | 0.014 | 0.0031 | |
| EE | <u>0.03</u> | 0.23 | 1.82 | 0.012 | 0.0022 | 0.032 | 0.0012 | 0.018 | 0.017 | 0.0041 | 0.10 |
| FF | <u>0.15</u> | 0.21 | 1.41 | 0.015 | 0.0015 | 0.028 | 0.0013 | 0.032 | 0.015 | 0.0039 | 0.10 |
| GG | 0.07 | 0.17 | <u>0.63</u> | 0.014 | 0.0014 | 0.031 | 0.0009 | 0.024 | 0.012 | 0.0032 | |

| STEEL TYPE | Cr | Cu | Mo | V | Ca | Ti/N | $V_{C90}$ | NOTE |
|---|---|---|---|---|---|---|---|---|
| A | | | | | | 3.8 | 27.0 | INVENTION EXAMPLE |
| B | | | 0.05 | | 0.0021 | 4.7 | 20.4 | |
| C | | | 0.06 | | 0.0023 | 5.8 | 30.9 | |
| D | 0.30 | | 0.27 | | 0.0018 | 3.8 | 28.9 | |
| E | 0.69 | | 0.10 | | 0.0031 | 4.6 | 26.7 | |
| F | 0.05 | 0.13 | 0.05 | | 0.0044 | 5.4 | 15.7 | |
| G | | | 0.07 | 0.04 | 0.0024 | 5.2 | 16.8 | |
| AA | | | | | | 3.8 | 119.7 | COMPARATIVE EXAMPLE |
| BB | | | | | | <u>1.6</u> | 27.0 | |
| CC | | | 0.20 | | 0.0021 | 4.7 | <u>8.9</u> | |
| DD | | | | | 0.0022 | 4.5 | <u>45.0</u> | |
| EE | 0.20 | | | | | 4.1 | 21.0 | |
| FF | 0.10 | | | | | 3.8 | 28.3 | |
| GG | | | 0.18 | | | 3.8 | <u>108.3</u> | |

BLANK MEANS THAT ELEMENT IS NOT ADDED INTENTIONALLY.
UNDERLINE MEANS THAT NUMERICAL VALUE IS OUTSIDE RANGE OF PRESENT INVENTION.

TABLE 2

| TEST NUMBER | STEEL TYPE | PLATE THICKNESS mm | HOT-ROLLING CONDITIONS | | | | STEEL PIPE OUTER DIAMETER mm | TEMPERING AT STEEL PIPE °C. |
| | | | HEATING TEMPERATURE °C. | ROLLING FINISHING TEMPERATURE °C. | COOLING RATE (MIDDLE OF PLATE THICKNESS) °C./s | COILING TEMPERATURE °C. | | |
|---|---|---|---|---|---|---|---|---|
| 1 | A | 10 | 1230 | 880 | 18 | 200 | 177.8 | |
| 2 | B | 12 | 1180 | 830 | 16 | 80 | 177.8 | |
| 3 | C | 10 | 1130 | 800 | 21 | 130 | 273.1 | |
| 4 | C | 7 | 1130 | 780 | 30 | 80 | 139.8 | |
| 5 | D | 15 | 1230 | 850 | 20 | 220 | 273.1 | |
| 6 | E | 14 | 1130 | 820 | 21 | 60 | 193.6 | |
| 7 | F | 13 | 1180 | 790 | 17 | 280 | 193.6 | |
| 8 | G | 14 | 1230 | 870 | 18 | 180 | 273.1 | |
| 9 | A | 10 | 1230 | 880 | 20 | <u>550</u> | 177.8 | |
| 10 | A | 10 | 1230 | 880 | 18 | 200 | 177.8 | 400 |
| 11 | A | 10 | 1230 | 880 | 8 | 250 | 177.8 | |
| 12 | AA | 10 | 1230 | 870 | 21 | 100 | 177.8 | |
| 13 | BB | 10 | 1230 | 880 | 23 | 70 | 177.8 | |
| 14 | CC | 10 | 1230 | 880 | 23 | 80 | 177.8 | |
| 15 | DD | 12 | 1210 | 850 | 19 | 110 | 193.6 | |
| 16 | EE | 10 | 1230 | 860 | 21 | 90 | 273.1 | |
| 17 | FF | 12 | 1210 | 870 | 19 | 130 | 193.6 | |
| 18 | GG | 12 | 1210 | 870 | 20 | 150 | 193.6 | |

TABLE 2-continued

| | | STEEL PIPE PROPERTIES | | | | | |
|---|---|---|---|---|---|---|---|
| TEST NUMBER | YS MPa | YIELD POINT ELONGATION % | TS MPa | Y/T % | API 5CT REQUIRED VALUE J | CVN VALUE 0° C. J | NOTE |
| 1 | 793 | NONE | 891 | 89 | 20 | 92 | INVENTION EXAMPLE |
| 2 | 805 | NONE | 885 | 91 | 20 | 81 | |
| 3 | 799 | NONE | 869 | 92 | 20 | 86 | |
| 4 | 821 | NONE | 883 | 93 | 20 | 92 | |
| 5 | 784 | NONE | 881 | 89 | 23 | 162 | |
| 6 | 799 | NONE | 918 | 87 | 22 | 38 | |
| 7 | 773 | NONE | 869 | 89 | 21 | 151 | |
| 8 | 786 | NONE | 893 | 88 | 22 | 173 | |
| 9 | 509 | NONE | 585 | 87 | 20 | 162 | COMPARATIVE EXAMPLE |
| 10 | 872 | 1.2 | 899 | 97 | 20 | 78 | |
| 11 | 757 | NONE | 832 | 91 | 20 | 78 | |
| 12 | 714 | NONE | 881 | 81 | 20 | 105 | |
| 13 | 753 | NONE | 846 | 89 | 20 | 95 | |
| 14 | 992 | NONE | 1078 | 92 | 20 | 44 | |
| 15 | 582 | NONE | 710 | 82 | 20 | 122 | |
| 16 | 578 | NONE | 590 | 98 | 20 | 212 | |
| 17 | 764 | NONE | 967 | 79 | 20 | 13 | |
| 18 | 620 | NONE | 765 | 81 | 20 | 82 | |

UNDERLINE MEANS THAT NUMERICAL VALUE IS OUTSIDE RANGE OF PRESENT INVENTION.

As shown in Table 2, in all examples each falling within the range of the present invention, satisfactory results were able to be obtained with regard to each of the yield stress, the tensile strength, the yield to tensile ratio, and the toughness of the electric resistance welded steel pipe manufactured without performing the quenching and tempering. Further, in all examples each falling within the range of the present invention, the yield point elongation was not observed in the result of the tensile test.

On the other hand, in Test number 9, the coiling temperature was higher than the range of the present invention, so that the transformation became insufficient, and consequently the sufficient tensile strength was not able to be obtained.

Test number 10 was one that was subjected to the tempering at 400° C. after the electric resistance welding. The tempering was performed, so that the sufficient tensile strength was able to be obtained, but the yield point elongation was observed. Further, in Test number 11, the cooling rate was slower than the range of the present invention, so that a desired structure was not formed and thus the sufficient tensile strength was not able to be obtained.

Further, in Test number 12, the B content was set to be less than the range of the present invention, so that the hardenability was not able to be secured sufficiently. As a result, the sufficient tensile strength was not able to be obtained.

Further, in Test number 13, Ti/N fell outside the range of the present invention, so that it was not possible to sufficiently fix solid solution N as TiN, and BN deteriorating the hardenability was formed and thus the hardenability was deteriorated. Thus, the sufficient tensile strength was not able to be obtained.

In Test number 14, $V_{C90}$ being the parameter of the hardenability was less than the range of the present invention, so that the yield stress was increased drastically.

On the other hand, in Test number 15, $V_{C90}$ being the parameter of the hardenability exceeded the range of the present invention, so that the strength and the yield to tensile ratio were decreased.

In Test number 16, the C content was set to be less than the range of the present invention, so that the hardenability was not able to be obtained sufficiently. As a result, the sufficient tensile strength was not able to be obtained.

On the other hand, in Test number 17, the C content exceeded the range of the present invention, so that the yield to tensile ratio and the toughness were decreased.

Further, in Test number 18, the Mn content was less than the range of the present invention, so that polygonal ferrite was formed, and thus the sufficient tensile strength was not able to be obtained.

From these results, it was possible to confirm the above-described knowledge, and further to prove the reasons for limiting each of the above-described chemical compositions of steel slab and limiting the manufacturing method.

The invention claimed is:

1. An electric resistance welded oil country tubular goods comprising:
   a chemical composition that contains, in mass %,
   C: 0.08% to 0.12%,
   Si: 0.03 to 0.5%,
   Mn: 0.80 to 2.2%,
   P: 0.03% or less,
   S: 0.003% or less,
   Al: 0.08% or less,
   Nb: 0.01% to 0.10%,
   Ti: 0.005 to 0.03%,
   B: 0.0005 to 0.0030%, and
   N: 0.008% or less and in which Ti>3.4 N is satisfied, its balance is composed of Fe and inevitable impurities, and $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo],
   wherein the electric resistance welded oil country tubular goods has a yield stress of 758 to 965 MPa, a tensile strength of 862 MPa or more, and a yield to tensile ratio of 85% to 95%, and
   the electric resistance welded oil country tubular goods does not have yield point elongation in a test result of a tensile test, $$\log V_{C90} = 2.94 - 0.75(2.7[C] + 0.4[Si] + [Mn] + 0.45[Ni] + 0.45[Cu] + 0.8[Cr] + 2[Mo]) \quad \text{Expression (1),}$$

and wherein
a structure of the electric resistance welded oil country tubular goods other than a structure of an electric resistance welded portion consists of a bainite structure in which cementite exists in a lath-shaped structure,
wherein heat treatment with respect to a pipe body is not performed after the electric resistance welding, and
wherein the pipe body has a thickness of 5-20 mm and an outer diameter of 139.8-273.1 mm.

2. The electric resistance welded oil country tubular goods according to claim 1, further containing one type or two types or more selected from, in mass %,
Ni: 1% or less,
Cu: 1% or less,
Mo: 0.3% or less,
Cr: 0.8% or less,
V: 0.1% or less, and
Ca: 0.0060% or less.

3. An electric resistance welded oil country tubular goods manufactured by hot-rolling a steel slab and performing coiling at 300° C. or lower to make a hot-rolled steel plate, and then forming the hot-rolled steel plate into a pipe shape and subjecting edge surfaces to electric resistance welding, and wherein heat treatment with respect to a pipe body is not performed after the electric resistance welding, and
wherein the steel slab has a chemical composition that contains, in mass %,
C: 0.08% to 0.12%,
Si: 0.03 to 0.5%,
Mn: 0.80 to 2.2%,
P: 0.03% or less,
S: 0.003% or less,
Al: 0.08% or less,
Nb: 0.01% to 0.10%,
Ti: 0.005 to 0.03%,
B: 0.0005 to 0.0030%, and
N: 0.008% or less and in which Ti>3.4 N is satisfied, its balance is composed of Fe and inevitable impurities, and $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo],
wherein the electric resistance welded oil country tubular goods has a yield stress of 758 to 965 MPa, a tensile strength of 862 MPa or more, and a yield to tensile ratio of 85% to 95%, and
the electric resistance welded oil country tubular goods does not have yield point elongation in a test result of a tensile test, $$\log V_{C90}=2.94-0.75(2.7[C]+0.4[Si]+[Mn]+0.45[Ni]+0.45[Cu]+0.8[Cr]+2[Mo]) \qquad \text{Expression (1)},$$

and wherein a structure of the electric resistance welded oil country tubular goods other than a structure of an electric resistance welded portion consists of a bainite structure in which cementite exists in a lath-shaped structure, and
wherein the pipe body has a thickness of 5-20 mm and an outer diameter of 139.8-273.1 mm.

4. The electric resistance welded oil country tubular goods according to claim 3, further containing one type or two types or more selected from, in mass %,
Ni: 1% or less,
Cu: 1% or less,
Mo: 0.3% or less,
Cr: 0.8% or less,
V: 0.1% or less, and
Ca: 0.0060% or less.

5. A manufacturing method of an electric resistance welded oil country tubular goods comprising:
hot-rolling a steel slab;
performing coiling at 300° C. or lower to make a hot-rolled steel plate;
then forming the hot-rolled steel plate into a pipe shape; and
subjecting edge surfaces to electric resistance welding, and wherein heat treatment with respect to a pipe body is not performed after the electric resistance welding, and
wherein the steel slab has a chemical composition that contains, in mass %,
C: 0.08% to 0.12%,
Si: 0.03 to 0.5%,
Mn: 0.80 to 2.2%,
P: 0.03% or less,
S: 0.003% or less,
Al: 0.08% or less,
Nb: 0.01% to 0.10%,
Ti: 0.005 to 0.03%,
B: 0.0005 to 0.0030%, and
N: 0.008% or less and in which Ti>3.4 N is satisfied, its balance is composed of Fe and inevitable impurities, and $V_{C90}$ defined by Expression (1) below is 15 to 40, where a C content (%) is represented by [C], an Si content (%) is represented by [Si], an Mn content (%) is represented by [Mn], an Ni content (%) is represented by [Ni], a Cu content (%) is represented by [Cu], a Cr content (%) is represented by [Cr], and a Mo content (%) is represented by [Mo],
wherein the electric resistance welded oil country tubular goods has a yield stress of 758 to 965 MPa, a tensile strength of 862 MPa or more, and a yield to tensile ratio of 85% to 95%, and
the electric resistance welded oil country tubular goods does not have yield point elongation in a test result of a tensile test, $$\log V_{C90}=2.94-0.75(2.7[C]+0.4[Si]+[Mn]+0.45[Ni]+0.45[Cu]+0.8[Cr]+2[Mo]) \qquad \text{Expression (1)},$$

wherein a structure of the electric resistance welded oil country tubular goods other than a structure of an electric resistance welded portion consists of a bainite structure in which cementite exists in a lath-shaped structure, and
wherein the pipe body has a thickness of 5-20 mm and an outer diameter of 139.8-273.1 mm.

6. The manufacturing method of the electric resistance welded oil country tubular goods according to claim 5, further containing one type or two types or more selected from, in mass %,
Ni: 1% or less,
Cu: 1% or less,
Mo: 0.3% or less,
Cr: 0.8% or less,
V: 0.1% or less, and
Ca: 0.0060% or less.

7. The manufacturing method of the electric resistance welded oil country tubular goods according to claim 5, wherein
a cooling rate in a range of 650 to 300° C. is set to 15 to 50° C./s.

* * * * *